United States Patent
Zhang et al.

(10) Patent No.: US 11,745,769 B2
(45) Date of Patent: Sep. 5, 2023

(54) DRIVER-ASSISTED AUTOMATED DRIVING SYSTEM UTILIZING DRIVER AS A SENSOR TO MINIMIZE AUTOMATED DRIVING DISENGAGEMENT

(71) Applicant: GM GLOBAL TECHNOLOGY OPERATIONS LLC, Detroit, MI (US)

(72) Inventors: Sycamore Zhang, Shanghai (CN); Jimmy Qi, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 151 days.

(21) Appl. No.: 17/307,673

(22) Filed: May 4, 2021

(65) Prior Publication Data

US 2022/0274631 A1   Sep. 1, 2022

(30) Foreign Application Priority Data

Feb. 26, 2021   (CN) .......................... 202110215910.1

(51) Int. Cl.
| | | |
|---|---|---|
| *B60W 60/00* | (2020.01) | |
| *G05D 1/00* | (2006.01) | |
| *B60W 50/14* | (2020.01) | |

(52) U.S. Cl.
CPC ........ *B60W 60/0059* (2020.02); *B60W 50/14* (2013.01); *B60W 60/0051* (2020.02); *G05D 1/0061* (2013.01); *G05D 1/0088* (2013.01); *B60W 2050/143* (2013.01); *B60W 2050/146* (2013.01); *B60W 2540/21* (2020.02); *B60W 2540/215* (2020.02)

(58) Field of Classification Search
CPC ............. B60W 60/0059; B60W 60/00; B60W 60/0051; B60W 30/143; G06V 10/987; G06V 40/172; G06V 20/59; G06F 3/011; G06T 11/60; G08G 1/166
See application file for complete search history.

(56) References Cited

U.S. PATENT DOCUMENTS

| | | | | |
|---|---|---|---|---|
| 9,489,635 | B1 * | 11/2016 | Zhu ..................... | G06V 10/987 |
| 11,488,398 | B2 * | 11/2022 | Porta .................... | G06V 40/172 |
| 2019/0051030 | A1 * | 2/2019 | Choi ....................... | G06T 11/60 |
| 2019/0300003 | A1 * | 10/2019 | Shiraishi ................. | G06F 3/011 |
| 2021/0070307 | A1 * | 3/2021 | Welch ..................... | G06F 3/011 |

FOREIGN PATENT DOCUMENTS

| | | | | | |
|---|---|---|---|---|---|
| DE | 102016124708 | A1 * | 10/2017 | ............ | B60W 10/04 |
| DE | 102019004265 | A1 * | 5/2020 | .......... | B60W 30/143 |

* cited by examiner

*Primary Examiner* — Yuri Kan

(57) ABSTRACT

An automated driving system includes perception, intervention, and vehicle control modules. The perception module detects an upcoming situation to be experienced by a vehicle. The intervention module: determines that a low confidence level exists for a driving decision to be made for the upcoming situation; enables intervention of an autonomous driving mode and indicate information pertaining to the upcoming situation to a driver of the vehicle via an interface; based on the upcoming situation, requests assistance from the driver by (i) indicating available options for the situation via the interface, or (ii) requesting information from the driver to aid in making the driving decision; and determine whether an input has been received from the driver via the interface indicating (i) a selected one of the available options, or (ii) the requested information. The vehicle control module autonomously drives the vehicle based on whether the input has been received.

20 Claims, 7 Drawing Sheets

DRIVER-ASSISTED AUTOMATED DRIVING SYSTEM UTILIZING DRIVER AS A SENSOR TO MINIMIZE AUTOMATED DRIVING DISENGAGEMENT

CROSS-REFERENCE TO RELATED APPLICATIONS

This application claims the benefit of Chinese Patent Application No. 202110215910.1, filed on Feb. 26, 2021. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to driver assistance systems associated with partial and conditional automation levels.

The Society of Automotive Engineers (SAE) J3016 standard is the U.S. Department of Transportation (DoT)'s official reference for defining the levels of vehicle autonomy. There are six levels (i.e. 0-5), where level 0 refers to vehicles with no automation, level 1 refers to vehicles with driver assistance, level 2 refers to vehicles with partial automation, level 3 refers to vehicles with conditional automation, level 4 refers to vehicles with high automation and level 5 refers to vehicles with full automation. At levels 0-1, driving control is dominated by the driver. At levels 2-3, driving control is preferentially performed by the in-vehicle control system, but is handed over to the driver for a significant number of situations. Little to no interaction occurs between the driver and the in-vehicle control system of a level 2 or 3 vehicle. At levels 4-5, driving control is dominated by in-vehicle control system with preference to be driverless.

SUMMARY

An automated driving system is provided and includes a perception module, an intervention module, and a vehicle control module. The perception module is configured to detect an upcoming situation to be experienced by a vehicle. The intervention module is configured to: determine that a low confidence level exists for a driving decision to be made for the upcoming situation; enable intervention of an autonomous driving mode and indicate information pertaining to the upcoming situation to a driver of the vehicle via an interface; based on the upcoming situation, request assistance from the driver by at least one of (i) indicating available options for the situation via the interface, or (ii) requesting information from the driver to aid in making the driving decision; and determine whether an input has been received from the driver via the interface indicating at least one of (i) a selected one of the available options, or (ii) the requested information. The vehicle control module is configured to autonomously drive the vehicle based on whether the input has been received.

In other features, the interface includes at least one of a touch screen, a display, a speaker, or a microphone.

In other features, the vehicle control module is configured to, in response to receiving the input from the driver, autonomously drive the vehicle based on the input.

In other features, the intervention module is configured to display a default option as one of the available options. The vehicle control module is configured to, when an input from the driver is not received via the interface within a set period of time from when the assistance was requested, autonomously drive the vehicle based on the default option. The default option is a most conservative option of the available options.

In other features, the intervention module is configured to limit the intervention by the driver to a restricted role of providing a driver input without permitting the driver to control an actuator of the vehicle.

In other features, the selected one of the available options is the driving decision.

In other features, the vehicle control module is configured to make the driving decision based on the input and autonomously drive the vehicle based on the driving decision.

In other features, the intervention module is configured to permit direct intervention of the autonomous driving mode by the driver when a set of options are available for a particular scenario.

In other features, the intervention module is configured to: determine that a low confidence level exists for a perception result obtained by the perception module; permit indirect intervention of the autonomous driving mode by the driver, to request information from the driver pertaining to the perception result; and modify the perception result based on the requested information as received from the driver.

In other features, the intervention module is configured to solicit the input from the driver while indicating to the driver via the interface the situation.

In other features, the vehicle control module is configured to, for a direct intervention, enforce a selected one of the available options selected by the driver.

In other features, the vehicle control module is configured to, for an indirect intervention, modify a perception result based on the requested information received from the driver via the interface.

In other features, a method of operating an automated driving system is provided and includes: detecting an upcoming situation to be experienced by a vehicle; determining that a low confidence level exists for a driving decision to be made for the upcoming situation; enabling intervention of an autonomous driving mode and indicate information pertaining to the upcoming situation to a driver of the vehicle via an interface; based on the upcoming situation, requesting assistance from the driver by at least one of (i) indicating available options for the situation via the interface, or (ii) requesting information from the driver to aid in making the driving decision; determining whether an input has been received from the driver via the interface indicating at least one of (i) a selected one of the available options, or (ii) the requested information; and autonomously driving the vehicle based on whether the input has been received.

In other features, the method further includes, in response to receiving the input from the driver, autonomously drive the vehicle based on the input.

In other features, the method further includes: displaying a default option as one of the available options; and when an input from the driver is not received via the interface within a set period of time from when the assistance was requested, autonomously driving the vehicle based on the default option. The default option is a most conservative option of the available options.

In other features, the method further includes limiting the intervention by the driver to a restricted role of providing a driver input without permitting the driver to control an actuator of the vehicle.

In other features, the method further includes: for a direct intervention, enforcing the selected one of the available options as the driving decision; and for an indirect intervention, making the driving decision based on the input and autonomously driving the vehicle based on the driving decision.

In other features, the method further includes: permitting direct intervention of the autonomous driving mode by the driver when a set of options are available for a particular scenario; determining that a low confidence level exists for a perception result obtained; permitting indirect intervention of the autonomous driving mode by the driver, to request information from the driver pertaining to the perception result; and modifying the perception result based on the requested information as received from the driver.

In other features, the method further includes soliciting the input from the driver while indicating to the driver via the interface the situation.

In other features, the method further includes: for a direct intervention, enforce a selected one of the available options selected by the driver; and for an indirect intervention, modify a perception result based on the requested information received from the driver via the interface.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
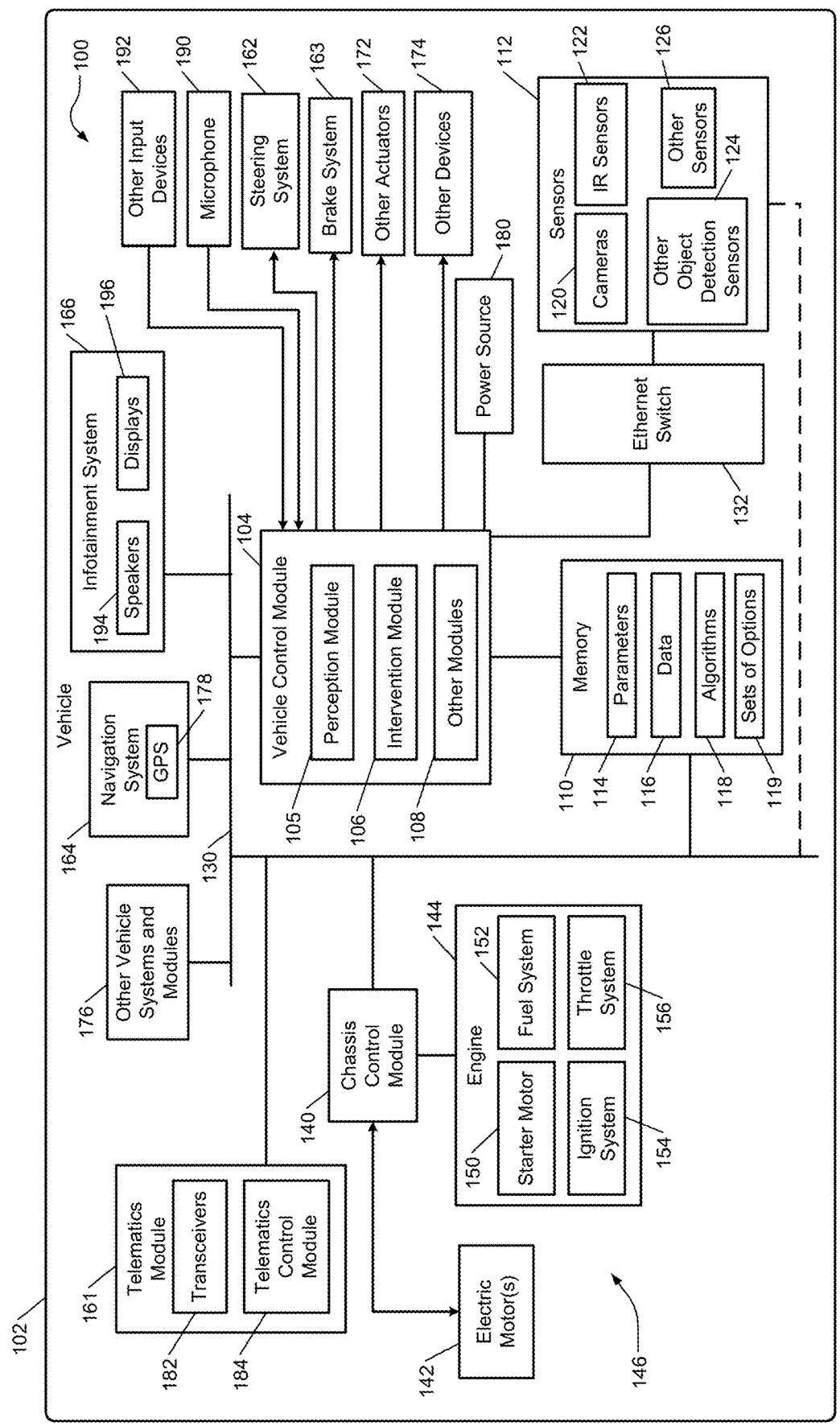
FIG. 1 is a functional block diagram of an example of an automated driving system including an intervention module in accordance with the present disclosure.

Levels 2-3 of the SAE J3016 standard (referred to as L2 and L3) have a significant amount of room for reducing situations under which driving control needs to be handed over to a human driver. The examples set forth herein are directed to reducing the number of situations under which driving control is handed over to a human driver. In-vehicle systems are disclosed that use a human driver (hereinafter referred to as "the driver") as a sensor and not as an actuator. In other words, when certain situations arise, the systems request input from the driver and based on the driver input make decisions, which affect how actuators (steering actuators, accelerating actuators, decelerating actuators, etc.) are controlled. The systems control the actuators, not the driver. The systems include an intervention module that interacts with the driver including providing the driver different options to select from and/or requesting certain information. The driver then makes a selection and/or provides the requested information. The systems perform driving operations based on the feedback provided by the driver. This is accomplished without disengagement of automated driving and without the driver taking over driving control.

The disclosed systems facilitate a driver in providing assistance in certain driving situations, referred to as scenarios. This is accomplished while (or in parallel to) performing effective machine learning and training operations based on driver decisions for improved current and future decisions made by the systems. The driver assistance reduces the need for disengagement of an automated (or autonomous) driving mode. The automated driving mode refers to when the systems autonomously control driving operations, such as steering, accelerating, decelerating, etc. When disengaged, the driver takes control and drives the vehicle.

The disclosed systems perform a cost-effective methodology to improve a user experience for automated driving vehicles with emphasis on complementing system capabilities associated with the SAE J3016 levels L2 and L3. This is accomplished by requesting assistance from a driver for driving decisions made by the systems. The systems make the driver aware of path planning, motion control, and confidence levels of certain information and/or possible decisions that may be made. The systems may then, for information and/or driving decisions where confidence levels are low, request feedback from the driver. The systems convey various information via, for example, a HMI, such as an infotainment system and/or one or more other displays to allow the driver to visualize the provided information. The driver may decide whether to intervene when appropriate. The HMI may convey intervention information collected from the driver to an intervention module and/or other module of the vehicle. If information is requested, and the driver decides not to intervene and/or provide input, the systems operate conservatively (i.e. in a safe manner) and select a default option that is safe for the vehicle, vehicle occupants and surrounding objects.

The disclosed examples include systems receiving driver assistance, which is unlike traditional automated driving vehicles that commonly have emphasis on in-vehicle systems assisting the driver. The disclosed examples thus complement existing SAE J3016 L2 and L3 operating schemes.

The systems disclosed herein make automated driving decisions with improved adaptiveness to road situations, especially for scenarios for which the systems have corresponding low confidence levels in making the driving decisions. The methods implemented by the systems reduce the need for disengagement of automated driving for certain situations, which traditionally would require a driver to take over driving control. This allows the systems to maintain automated driving control for longer more continuous periods of time. The reduced number of disengagements results in noticeable improvements in the driving experience for L2 and L3 automated driving vehicles and/or other vehicles operating with preference of driving control being implemented by an in-vehicle system and not a human driver. The systems operate based on an assumption that a human driver is present. The disclosed examples are applicable to passenger vehicles and other forms of transportation.

The disclosed in-vehicle systems include path planning and vehicle motion control used in L2 and L3 vehicles, as well as intervention operations not traditionally performed. For example, driver intervention is conveyed via a HMI and utilized as an effective source for driving decisions with automated features. This improves the driving experience by reducing frequency of disengagement. When disengagement occurs, driving decisions are made and enforced by the driver because the in-vehicle system is disengaged. By having less disengagement occurrences, the driving decisions are more continuously made and enforced by the in-vehicle systems.

As used herein, the term "scenario" may refer to an abstraction of road situations, especially for road situations in which it is difficult for an automated driving system to make timely decisions with a high confidence level. The term "scenario" may refer to a "scenario inference" or a "scenario-specific event solicitation", as further described below. As used herein, the term "event" may refer to intervention of a driver and correspond to one of a limited number of types of scenarios feasible for being handled by an automated driving system. As used herein, the phrase "event handling" may refer to monitoring an intervention event of a driver and modifying a perception result and/or a driving decision based on an input received from the driver. In the following description, these terms and phrase are further defined in the sense of processing operations. As a couple of examples, the phrase "driving decision" may refer to an on-board module of a vehicle selecting from one of multiple options for a particular task at hand and/or performing an operation (e.g., a steering, accelerating, decelerating, moving forward, moving reward, and/or standing still operation) based on information requested and received from a driver.

FIG. 1 shows an automated driving system 100 implemented within a vehicle 102 and may be referred to as an in-vehicle system and/or advanced driving assistance system. The vehicle 102 may be a L2 or L3 level vehicle configured to perform automated driving operations, as described and disclosed herein. The automated driving system 100 includes a vehicle control module 104, which may communicate with and/or control operation of various modules and systems of the vehicle 102.

The vehicle control module 104 may include one or more modules, such as a perception module 105 for detecting an environment and situation the vehicle 102 is currently encountering and/or is about to encounter. The one or more modules may also include an intervention module 106 for implementing driver interventions as disclosed herein. This includes aiding and enhancing automated driving decisions and associated operations. The one or more modules may be software modules that include executable code for processing flow of scenario, event and event handling associated operations. Some of these operations are depicted in FIGS. 3-7. The driving decisions are effectively ameliorated with imperceptible latency of a corresponding control loop. The vehicle control module 104 may perform machine-learning-based functionality to reduce need for repeated intervention. The vehicle control module 104 may include other modules 108.

The automated driving system 100 includes a memory 110 and sensors 112. The memory 110 may store parameters 114, data 116, and algorithms 118 (e.g., automated driving algorithms, machine-learning algorithms, etc.). The memory 110 may store sets of options 119 respectively for a limited number of scenarios and/or information to request from a driver for corresponding scenarios. The sensors 112 may be located throughout the vehicle 102 and include cameras 120, infrared (IR) sensors 122, other object detection sensors (e.g., radar and lidar sensors) 124, and/or other sensors 126. The other sensors 126 may include yaw rate sensors, accelerometers, global positioning system (GPS) sensors, air flow sensors, temperature sensors, pressure sensors, a vehicle speed sensor, motor speed sensors, etc.

The vehicle control module 104 and the sensors 112 may be in direct communication with each other, may communicate with each via a controller area network (CAN) bus 130, and/or via an Ethernet switch 132. In the example shown, the sensors 112 are connected to the vehicle control module 104 via the Ethernet switch 132, but may also or alternatively be connected directly to the vehicle control module 104 and/or the CAN bus 130.

The vehicle 102 may further include other control modules, such as a chassis control module 140 that controls torque sources including one or more electric motors 142 and one or more engines (one engine 144 is shown). The chassis control module 140 may control distribution of output torque to axles of the vehicle 102 via the torque sources. The chassis control module 140 may control operation of a propulsion system 146 that includes the electric motor(s) 142 and the engine(s) 144. Each of the engines may include a starter motor 150, a fuel system 152, an ignition system 154 and a throttle system 156.

In one implementation, the vehicle control module 104 is a body control module (BCM) that is in communication with and/or controls operation of a telematics module 161, a steering system 162, a brake system 163, a navigation system 164, an infotainment system 166, other actuators 172 and devices 174, and other vehicle systems and modules 176. The navigation system 164 may include a GPS 178. The other actuators 172 may include steering actuators and/or other actuators. The modules and systems 104, 140, 161, 162, 164, 166, 176 may communicate with each other via the CAN bus 130. A power source 180 may be included and power the vehicle control module 104 and other systems, modules, controllers, memories, devices and/or components. The power source 180 may include one or more batteries and/or other power sources. The vehicle control module 104 may perform countermeasures and/or autonomous vehicle operations based on planned trajectory of the vehicle 102, detected objects, locations of the detected objects, and/or other related operations and/or parameters. This may include controlling the stated torque sources and actuators as well as providing images, indications, and/or instructions via the infotainment system 166.

The telematics module 161 may include transceivers 182 and a telematics control module 184, which may be used for communicating with other vehicles, networks, infrastructure devices (e.g., at vehicles, traffic signs, buildings, base stations, etc.), edge computing devices, and/or cloud-based devices. The vehicle control module 104 may control the modules and systems 140, 161, 162, 163, 164, 166, 176 and other actuators, devices and systems (e.g., the actuators 172 and the devices 174). This control may be based on data from the sensors 112.

The perception module 105 may determine vehicles surroundings, locations relative to objects, upcoming situations, etc. based on information received from the sensors 112, the telematics module 161, the navigation system 164, and/or other devices, modules and/or systems referred to herein.

The intervention module 106 performs intervention operations using a HMI, which may include the infotainment system 166, a microphone 190, and other input devices 192 (e.g., buttons, dials, switches, etc.) and/or output devices (e.g., speakers, displays, lights, etc.). The infotainment system 166 may include speakers 194 and displays 196. The displays may include touch screens, instrument panel displays, center counsel displays, head up displays (HUDs), etc. Other examples are shown and described with respect to FIG. 2, which shows an example HMI 200.

The HMI 200 has a corresponding user interface (UI) layout for performing interactive operations. Other user interface layouts may be used. The HMI 200 may include an instrument panel 202, a steering wheel 204, and a HUD (the viewable image of which is represented by box 206 and may be on a windshield of the corresponding vehicle). The instrument panel 202 may include various displays 208, 210, 212, which may be touch screens for receiving input from a driver. The display 212 may include a built-in microphone. The instrument panel 202 may further include various other input devices, such as buttons, switches, dials, etc. (e.g., buttons 216, 218, 220, 221). The HMI 200 may include output devices other than the displays 206, 208, 210, 212, such as one or more speakers (e.g., speakers 221 or the speakers 194 of FIG. 1). The steering wheel 204 may include a light emitting display (LED) bar 222 including LEDs. The button 220 or other input device may be dedicated for enabling driver assistance (or intervention) by a driver. The HMI 200 may be used for implementing automated driving system functionality including accepting assistance from a driver, where the button 220 is a dedicated component for this functionality.

The intervention module 106 may provide information requests via the displays 206, 208, 210, 212, the speakers, and/or the LED bar 222. The intervention module 106 may receive inputs from a driver via the displays 206, 208, 210, 212, buttons 216, 218, 220, 221, the microphone of the display 212 or the microphone 190 of FIG. 1, and/or other input devices.

Figure 3:
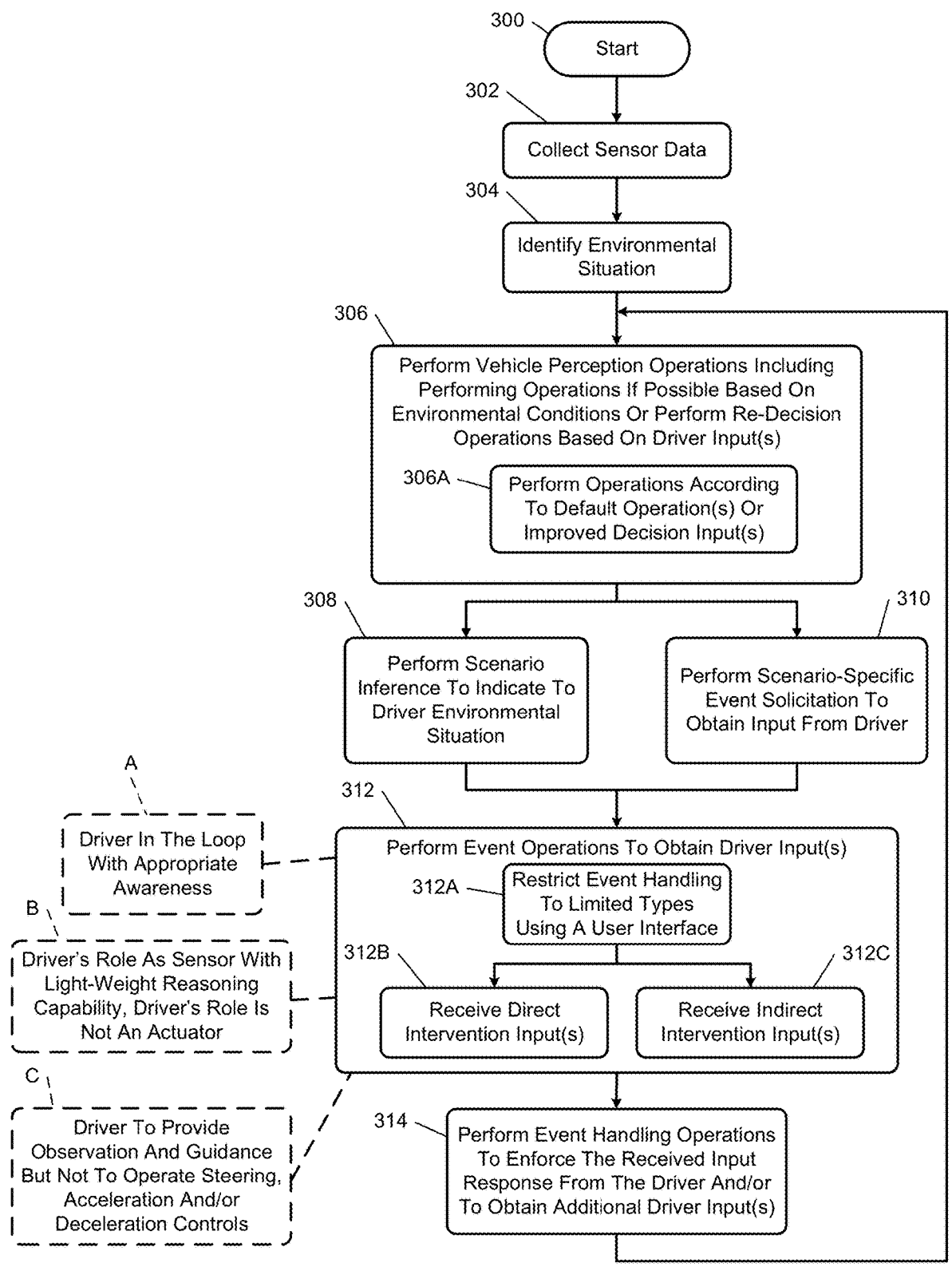
FIG. 3 illustrates a driver interactive and assisted automated driving method in accordance with the present disclosure.

FIG. 3 shows a driver interactive and assisted automated driving method. The operations may be implemented by the vehicle control module 104, the intervention module 106, the HMI 200 and/or other devices, modules and systems referred to herein. The operations may be iteratively performed.

The method may begin at 300. At 302, the vehicle control module 104 may collect sensor data from the sensors 112. At 304, the vehicle control module 104 may identify an environmental situation (or scenario). This may be an abstraction of a road situation. At 306, the perception module 105 may perform vehicle perception operations including performing operations if possible based on environmental conditions. This may include performing re-decision operations based on one or more driver inputs received. At 306A, the perception module 105 and/or intervention module 106 may perform operations according to default operations if no user input is received or based on improved decision inputs received from the driver.

At 308, the intervention module 106 may perform scenario inference operations to indicate to the driver the environmental situation. This may include indicating a situation and/or condition for which a near-future decision is to be made. Relevant notification information may be conveyed to the driver via the HMI 200 and/or other output devices referred to herein. The automated driving system 100, which is responsible for perception, decision and HMI interaction, determines via the intervention module 106 that it is difficult for the current scenario to make a highly confident and timely driving decision. The scenario and/or aspects thereof may be displayed to be visualized by the driver via the HMI 200. This may include text, color indications, display of images, etc., and may also be accompanied with sound notifications.

At 310, the intervention module 106 may perform scenario-specific event solicitation operations to obtain input from the driver. Operation 310 or a portion thereof may be performed while performing operation 308. Operation 310 may logically occur subsequent to operation 308. The intervention module 106 may indicate to the driver the situation that exists while requesting feedback and/or information from the driver.

At 312, the intervention module 106 may perform event operations to obtain driver inputs. At 312A, the intervention module 106 restricts event handling to limited types using a user interface, such as the HMI 200.

The driver is made aware of the scenario and/or situation, as represented by box A. The driver inputs are referred to as interventions on near-future path planning and/or motion control. The driver may decide which option to choose, what modification to be performed, and/or what information to provide and may convey this intervention indication via voice commands and/or touch actions, which are received as inputs by the intervention module 106. Although the driver may input selection of the default option, the driver may not perform any action when the driver decides to proceed with the default option. If no action is taken by the driver, no input is received and the default option is automatically selected.

The driver performs a restricted role by providing input and/or information assistance based on the event. The driver may provide inputs via the HMI 200 without touching the steering wheel, accelerator pedal and/or decelerator (e.g., brake) pedal of the vehicle. The driver's role may vary based on the event and/or scenario. The driver's role is similar to a sensor, but has lightweight reasoning capability. The driver does not act as an actuator and, for example, turn a steering wheel and/or press an accelerator pedal or decelerator pedal. This is represented by box B. The driver provides observation and guidance, but does not operate (or actuate) steering, acceleration and/or deceleration controls of vehicle. This is represented by box C.

At 312B, the intervention module 106 receives direct intervention inputs. In case of direct intervention, the intervention module 106 may present a set of decision options via the HMI 200 from which the driver can select. The options may include a default option. The default option may be the most conservative (or safest) one of the available options. The driver is not required to explicitly choose the default option, but rather may be enforced based on a non-selection by the driver of any of the options. The set of options may remain available to choose from for a limited amount of time, and afterwards the default option is enforced if the driver does not choose any option. The driver may provide inputs via the HMI 200 via voice and/or touch inputs for selection of scenario-specific options. A limited set of options may be provided to the driver and the driver can select one of the limited set of options provided. The driver may be prevented from selecting or inputting an option not in the limited set of options. As an example, the limited set of options may include "wait", "turn", "speed up" options for a particular scenario and may prevent the driver from, for example, requesting that a 'U'-turn be made.

Figure 6:
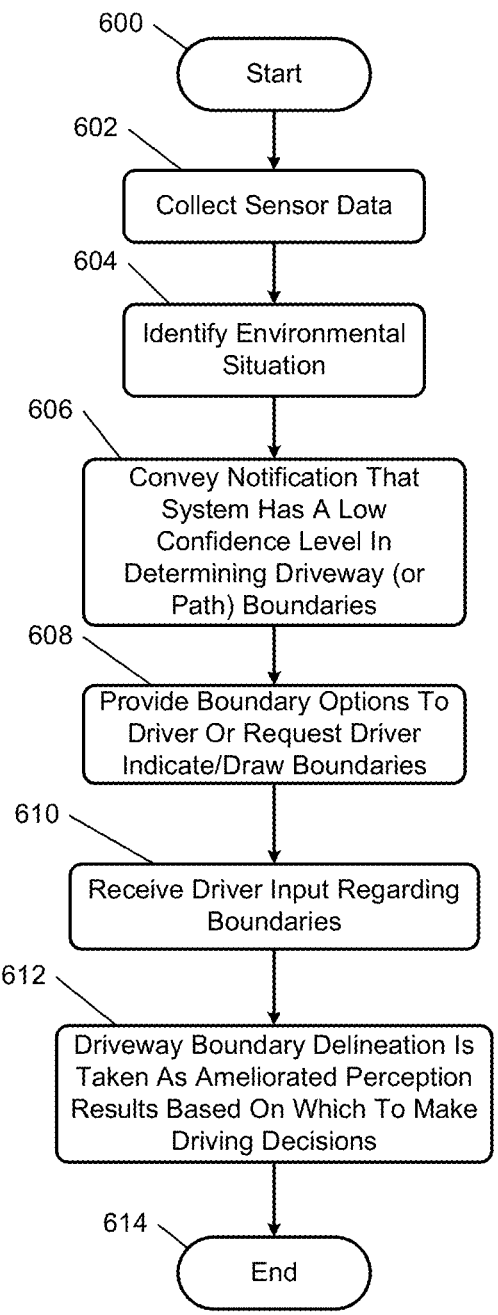
FIG. 6 a third example implementation of the method of FIG. 3 for a third example scenario.

At 312C, the intervention module 106 receives indirect intervention inputs. Indirect intervention occurs based on the perception results, which leads to a driving decision. This applies to scenarios having a high latency tolerance. In case of indirect intervention, the intervention module 106 prompts the applicable modifications on the perception results for the driver to perform. As an example, the intervention module 106 may request certain information from the driver. FIG. 6 provides an example, where the driver is requested to select and/or indicate boundaries of a path of the vehicle. The time window for the driver to select an option, accept an option, and/or provide requested information may be configured for each specific scenario.

At 314, the intervention module 106 performs event-handling operations to enforce the input response received from the driver and/or to obtain additional driver inputs. In case of direct intervention on the driving decision, the superseding decision is immediately enforced, and it causes the subsequent near-future driving decision (if present) to be re-derived. In case of indirect intervention on the perception results, further actions may be performed by the driver including providing additional inputs in order to produce ameliorated perception results by the perception module 105. The driving decision is enforced after being re-derived based on the ameliorated perception results.

FIG. 3 shows processing flow with human intervention involved in making driving decisions together with relevant restrictions. Operations 306, 308, 310, 312, 314 are part of a control loop, which can be modified to account for a latency constraint of driving decisions by restricting applicable interventions to ones feasible to be handled by a preloaded (but upgradable) set of event handling methods. The set of event handling methods may be implemented by one or more modules, such as the vehicle control module 104 and/or the intervention module 106, and stored in the memory 110 of FIG. 1. When multiple coordinated software interconnected modules are included to implement the event handling methods, the modules may be stored in the memory 110. As an example, a module may be included to perform each of the operations 306, 308, 310, 312, 314.

Figure 2:
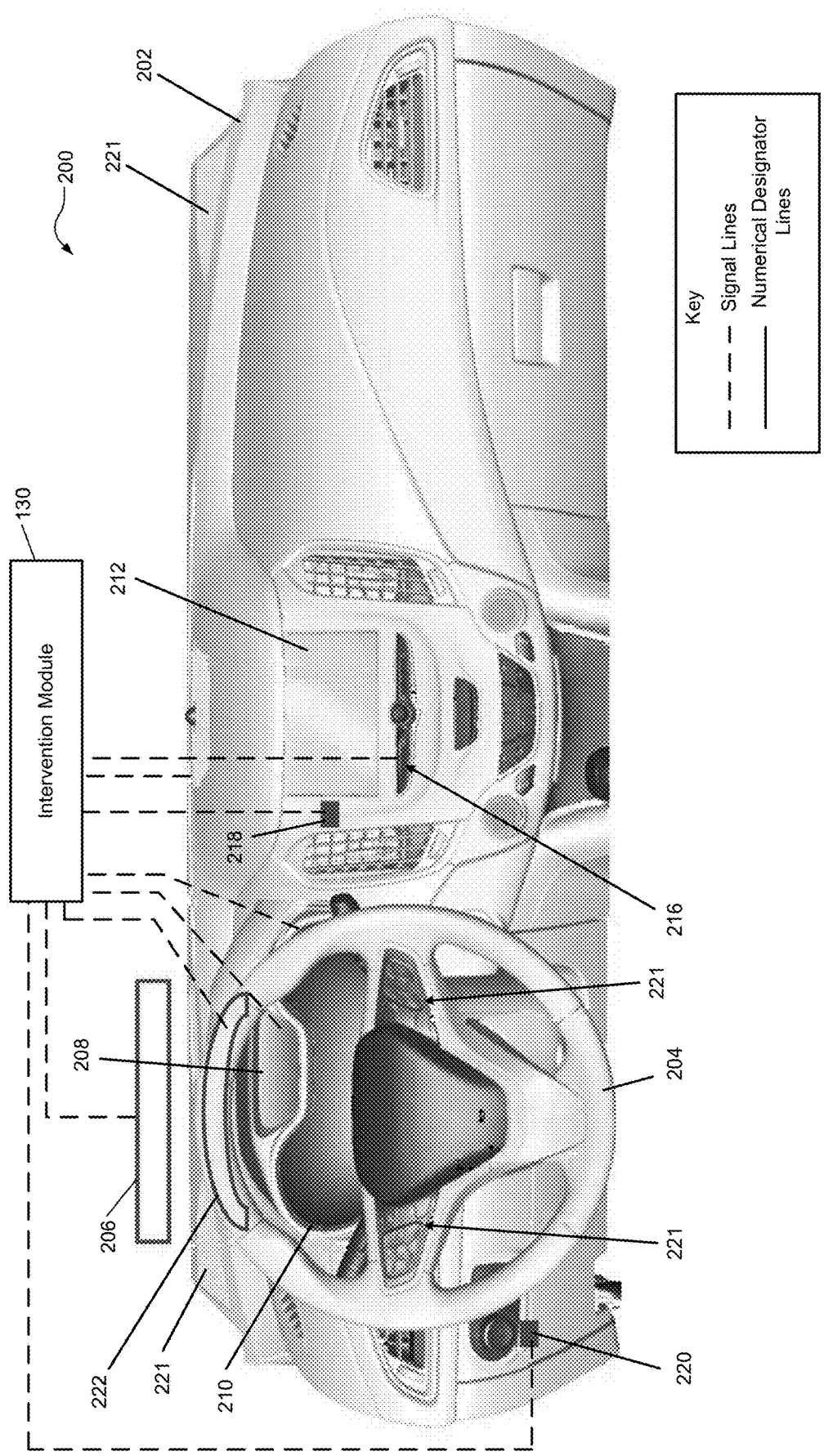
FIG. 2 is front view of an example of human-machine-interface (HMI) in accordance with the present disclosure.

In one implementation of the method of FIG. 3, the display 212, the speakers 221 of FIG. 2 and a microphone (e.g., the microphone of the display 212 or the microphone 190 of FIG. 1) are used. In this implementation, the HUD 206, the LED bar 222 and the button 218 may not be used. Sensors such as cameras, radar sensors, lidar sensors, and GPS sensors may be used for detecting objects, mapping a surrounding environment, and determining location of the corresponding vehicle relative to other objects. A vehicle-to-everything (V2X) onboard unit, such as the telematics module 161 of FIG. 1 may also be used.

During operation 308, the HUD 206, the LED bar 222, the speakers 221, and the display 212 are used to provide notifications to the driver. During operation 310, the display 212 is used to display, for example, options to select from with a default option highlighted. The selected option may then be followed, performed and/or implemented.

During operation 312, the intervention module 106 may receive an input from the driver. The driver may convey the selected option to the in-vehicle system using various methods. As an example, the selected option may be conveyed by the driver pressing one or more buttons, touching the display 212, and/or providing voice commands. A combination of buttons may be pressed sequentially or at the same time and/or a voice command may be provided. The driver may either hold down or press once a button or an icon, depending on the user configuration and/or the intended type of intervention (e.g., voice or touch control). This may include touching options and/or icons displayed on the display 212.

During option 314, the intervention module 106 may display on the display 212 various details of an interaction session with the driver to allow the driver to visualize aspects of the corresponding situation. This may include the intervention module 106 displaying an automated driving decision, which has involved driver interaction and driver input. This may be implemented in parallel with displaying on the display 212 a resultant driver decision (or option selected and/or information provided), which is being enforced.

Figure 4:
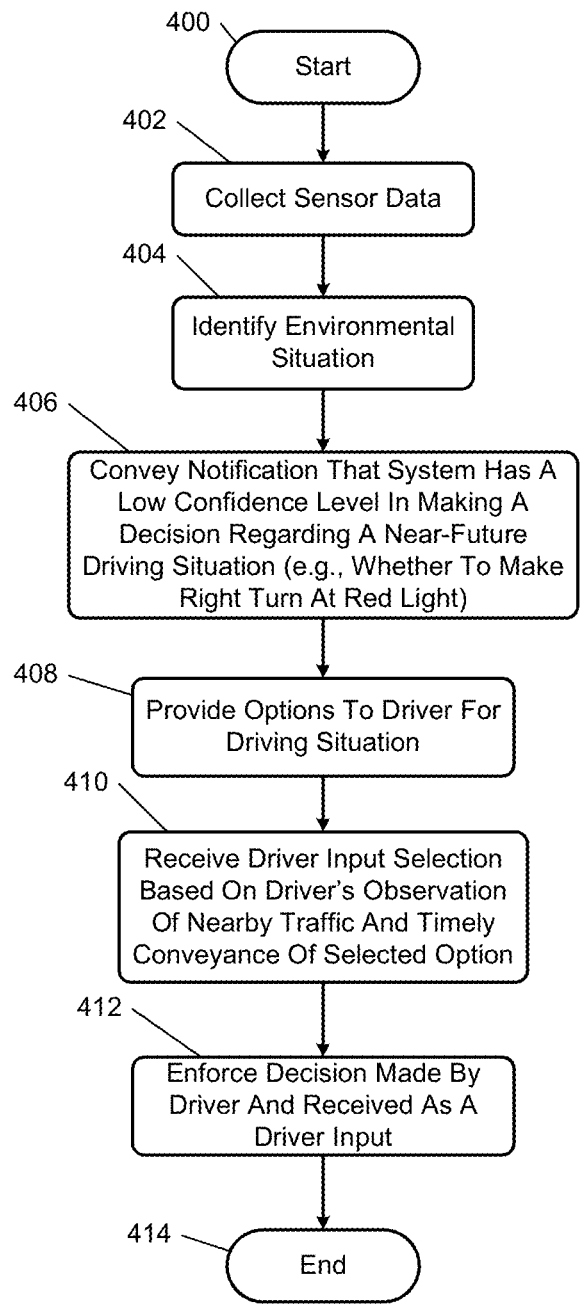
FIG. 4 illustrates a first example implementation of the method of FIG. 3 for a first example scenario.
Figure 5:
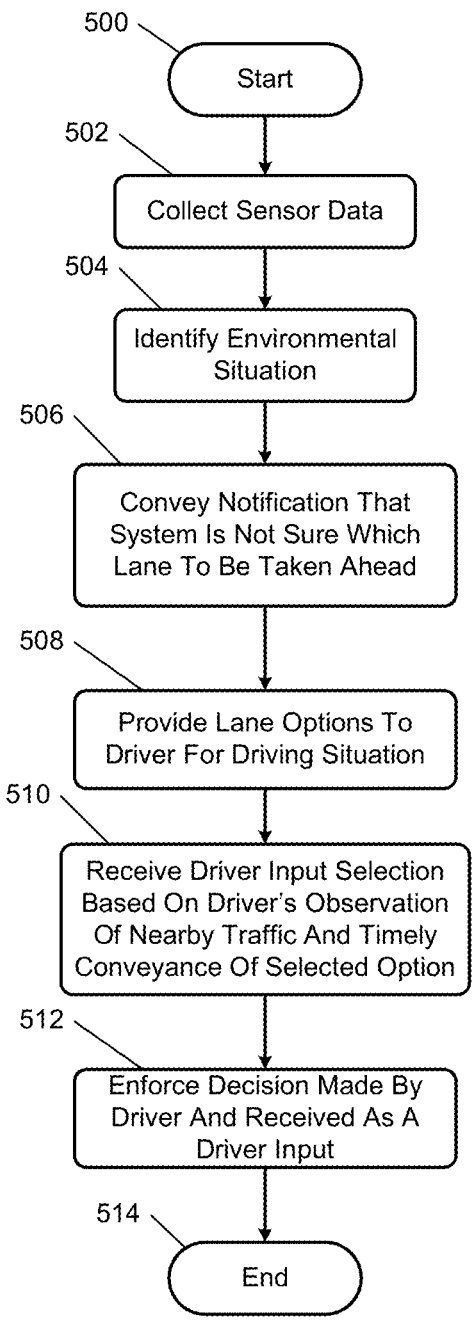
FIG. 5 a second example implementation of the method of FIG. 3 for a second example scenario.

The following FIGS. 4-6 may be implemented via the automated driving system 100 of FIG. 1 and the HMI 200 of FIG. 2. FIG. 4 shows a first example implementation of the method of FIG. 3 for a first example scenario. The method may begin at 400. At 402, the vehicle control module 104 may collect sensor data from the sensors 112. At 404, the vehicle control module 104 may identify an environmental situation (or scenario). This may be an abstraction of a road situation.

At 406, the intervention module 106 conveys notification that the system has a low confidence level associated with making a decision regarding a near future driving situation. As an example, the near future driving situation may include determining whether to make a right turn at an upcoming or current red light. The challenge of this scenario arises from the difficulty for the intervention module 106 and/or perception module 105 to determine if an intended lane in a target direction (with the presence of potentially conflicting traffic) is safe to steer into during a particular time window (e.g., several seconds). Direct intervention on the driving decision is applied for this scenario. The notification may be conveyed to the driver via the HMI 200. When the vehicle is close to perform a right turn on red light, with noticeable traffic along the target direction, the indication of "near-future driving decision having low confidence to be optimal" may be conveyed on the HMI 200 with the visualization of the situation indicating to the driver to get ready for intervention.

At 408, the intervention module 106 provides options to the driver for the driving situation. The options may include: "wait" (default, meaning the vehicle (referred to as the host vehicle) is to wait until no vehicle is detected as driving along a path of the target direction or a traffic light changes to green for the current direction); "turn" (meaning vehicle is to proceed with default speed and acceleration, and then turn right); and "speed up" (meaning host vehicle is to proceed at a speed under a speed limit for the road currently being traveled on, subject to safety constraint, and then turn right).

At 410, the intervention module 106 receives a selected driver input based on the driver's observation of nearby traffic and timely conveyance of selected option by the driver. This operation relies on the driver's observation on the nearby traffic and timely conveyance of the chosen option, which are feasible for moderately and highly experienced drivers.

At 412, the vehicle control module 104 enforces the selected option (referred to as the driving decision) made by the driver and autonomously drives the vehicle based on the driving decision. The driving decision may be the option chosen by the driver and is enforced. The method may end at 414.

FIG. 5 shows a second example implementation of the method of FIG. 3 for a second example scenario. The challenge of this scenario arises from the difficulty for the automated driving system to determine the exact lane for the vehicle to change to when some temporary road situation is perceived. The situation may be perceived by the automated driving system based on the collected sensor data and/or based on information received via a relevant V2X message from a device external to the vehicle. For example, with the reception of the relevant V2X message, the intervention module 106 is able to detect a temporary road situation (e.g., road work or traffic accident) that exists at a certain distance ahead. Due to the technical limitations resulted from both V2X standardization (e.g. message being mainly intended for notifying human drivers) and solution deployment (lack of vehicle-side and/or infrastructure-side capability for timely reflection of a precise road situation), a V2X message likely does not include a precise indication of lane closures and/or time periods of closure. For this reason, the V2X message is not sufficient to be used directly to derive a driving decision for the stated scenario. Similarly, it is also difficult for the perception module 105 to infer which exact lanes are closed as an inference of the temporary road situation.

The method may begin at 500. At 502, the vehicle control module 104 may collect sensor data from the sensors 112. At 504, the vehicle control module 104 may identify an environmental situation (or scenario). This may be an abstraction of a road situation.

At 506, the intervention module 106 conveys notification that automated driving system is unsure which traffic lane vehicle should take ahead. A lane change indication is indicated in advance, which is triggered by a detected temporary road situation. When the perception module 105 and/or intervention module 106 perceives some temporary road situation at a certain distance ahead, the indication of "not sure about which lane to be taken ahead" is conveyed on the HMI 200 with the visualization of the situation together with other form of notification indicating to the driver to get ready for intervention.

At 508, the intervention module 106 provides lane options to the driver via the HMI 200 for the current driving situation. The options may include: "keep" (keep driving on the current lane, the default option); "left 1" (change to the $1^{st}$ lane on the left subject to safety assurance); "left 2" (change to the $2^{nd}$ lane on the left subject to safety assurance); "right 1" (change to the $1^{st}$ lane on the right subject to safety assurance); and "right 2" (change to the $2^{nd}$ lane on the right subject to safety assurance) etc. These options may be, for example, displayed for viewing and selection.

At 510, the intervention module 106 receives a driver input indicated a selection made by the driver via the HMI 200. This is based on the driver's observation of nearby traffic and timely conveyance of the selected option. This relies on the driver determining which lane for the vehicle to change to by observing the actions of leading vehicles and timely conveying the selected option. This is feasible for moderately and highly experienced drivers.

At 512, the vehicle control module 104 enforces the driving decision made by the driver, which is one of the options conveyed to the driver and autonomously drives the vehicle based on the driving decision. The method may end at 514.

Figure 7:
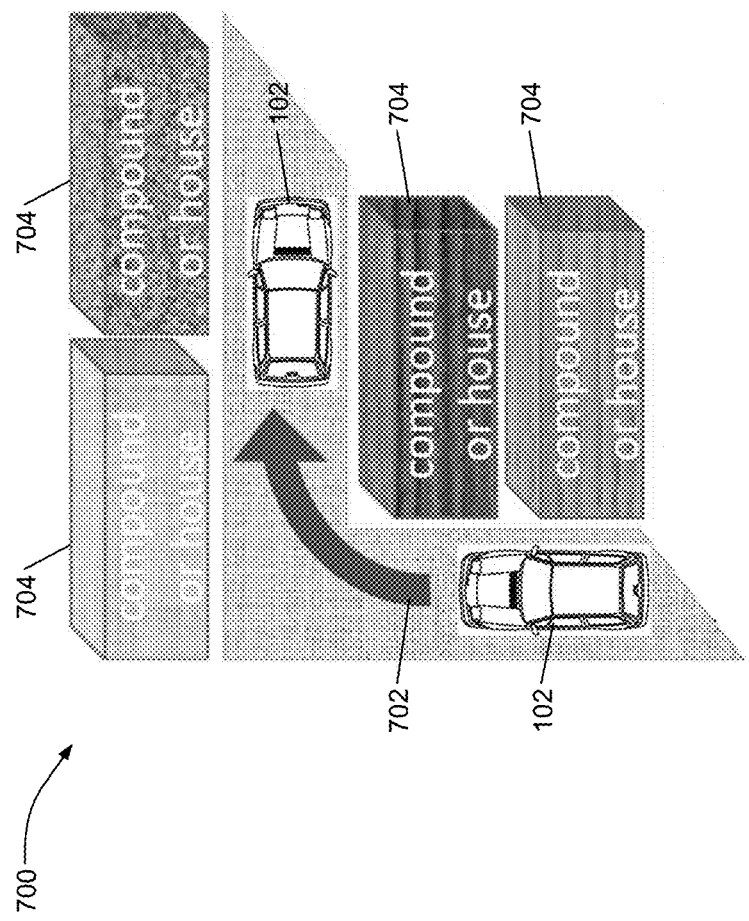
FIG. 7 is an example perspective view of the third scenario in accordance with the present disclosure.

FIG. 6 shows a third example implementation of the method of FIG. 3 for a third example scenario. The perception module 105 may perceive a narrow driveway 700 with L-shaped turn ahead and non-smoothed corner, as shown in FIG. 7. FIG. 7 shows the vehicle 102 making a right turn represented by arrow 702. The driveway 700 is near building structures 704 (e.g., businesses, residential homes, etc.). The example scenario includes the vehicle 102 performing a right turn on a narrow driveway, having an example width of 2.5 meters, with obstacles close by the driveway. This can be a road situation in a rural residential area.

The challenge of this scenario arises from the difficulty for the perception module 105 to detect the exact driveway boundaries, especially in some rural areas having irregular driveway appearances and topologies. Due to the low-speed characteristic of this scenario, which results in high latency tolerance, indirect intervention on the perception results is applied for this scenario.

The method may begin at 600. At 602, the vehicle control module 104 may collect sensor data from the sensors 112. At 604, the vehicle control module 104 may identify an environmental situation (or scenario). This may be an abstraction of a road situation.

At 606, the intervention module 106 conveys via the HMI 200 a notification that the automated driving system 100 has a low confidence level associated with determining driveway (or path) boundaries.

At 608, the intervention module 106 provides boundary options to the driver via the HMI 200 or requests that the driver indicate and/or draw the boundaries. This may be done via for example the display 212, which may be a touch screen. The driver can draw via the driver's finger the boundaries of the display 212 over an image of the environment displayed on the display 212. When the perception module 105 has a low confidence level for determined driveway boundaries, the indication of "low confidence on driveway boundary detection" is conveyed on the HMI 200 in addition to a notification for the driver to get ready for intervention. The vehicle control module 104 may adjust speed of the vehicle 102 to ensure sufficient safety. The driver is prompted to delineate the driveway boundaries by, for example, touch control via the HMI 200 to modify the original perception results. The vehicle 102 may automatically decelerate (e.g., apply the brakes) if it is not safe enough to move forward.

At 610, the intervention module 106 receives driver input regarding the boundaries. The driver provides the required delineation for the driveway boundaries and confirms the delineation.

At 612, the vehicle control module 104 and/or the intervention module 106 takes the driveway boundary delineation as an ameliorated perception result based on which to make driving decisions. The driveway boundary delineation provided by the driver is taken as the ameliorated perception result, after which the driving decision is (re-)derived and enforced. For example, after the boundaries are identified by the driver, the vehicle control module 104 controls steering, accelerating, and decelerating actuators to drive the vehicle forward and make a right turn as illustrated in FIG. 7 based on the indicated boundaries.

If a driver input is not received, the vehicle control module 104 may perform a default safe option, which may include standing still or moving slowly in a forward direction. The vehicle control module 104 performs an option that is determined to be a safe option. The method may end at 614.

The disclosed examples include performing methods to promote optimality of automated driving decisions based on assistance provided by a driver for certain situations. Driver feedback is provided via a HMI that processes intervention (e.g., voice and/or touch inputs) from the driver. The disclosed systems mitigate lack of optimality and robustness pertaining to in-vehicle advanced driver assistance systems. The disclosed systems also minimize hardware complexity needed for modules performing perception and driving decision operations.

Although some of the above-described methods are described with respect to a certain number of example scenarios, the methods disclosed herein are applicable to other scenarios. The systems disclosed herein are applicable to performing processing operations for various scenarios and events. The disclosed systems are able to receive software upgrades to recognize additional scenarios and perform similar operations for the additional scenarios.

The examples reduce the need for repeated interventions. The examples can include storing sets of options for respective scenarios, which may arise in different geographical areas. This may be due to, for example, national and regional traffic laws, local driving cultures, and personal driving habits. These options may either be pre-configured during manufacturing and/or prompted to be configured on first use. The options may be taken as inputs for making driving decisions, particularly for determining which one among several possible options to be presented as a default option to a driver, as applicable for a particular scenario.

Furthermore, for the difficulties of decision arising from very challenging scenarios and not solvable by configuring preference options, machine-learning-based functionality may be performed to learn how the driver intervenes or takes direct control of the vehicle (provided that the minimum safety condition is fulfilled). This is done such that the automated driving system is able to present a better "default option" for a driving decision based on a sufficient amount of data accumulated pertaining to a certain challenging (but not frequently encountered) scenario.

The automated driving system is configurable for accumulated data to be processed locally or uploaded to cloud servers for processing as training data, and over-the-air (OTA) update of software modules can be used to deploy the training outcomes suitable for mass deployment (i.e. not related to personal driving habits).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An automated driving system comprising:
   at least one processor;
   a perception module implemented by the at least one processor and configured to detect an upcoming situation to be experienced by a vehicle;
   an intervention module implemented by the at least one processor and configured to
      determine that a confidence level for a driving decision to be made for the upcoming situation is at a level to request driver assistance, the driving decision refers to a steering decision, a decision to accelerate, a decision to move forward, a decision to move rearward, or a decision to stand still,
      based on determining the confidence level for the driving decision to be made for the upcoming situation is at the level to request driver assistance, enable intervention of an autonomous driving mode and indicate information pertaining to the upcoming situation to a driver of the vehicle via an interface,
      based on the upcoming situation, request assistance from the driver by at least one of (i) indicating available options for the situation via the interface, or (ii) requesting information from the driver to aid in making the driving decision, and
      determine whether an input has been received from the driver via the interface indicating at least one of (i) a selected one of the available options, or (ii) the requested information; and
   a vehicle control module implemented by the at least one processor and configured to aid and enhance automated driving decisions and associated operations by making autonomous driving decisions to autonomously drive the vehicle based on at least one of i) the determination of whether the input has been received, and ii) the input received.

2. The automated driving system of claim 1, wherein the interface includes at least one of a touch screen, a display, a speaker, or a microphone.

3. The automated driving system of claim 1, wherein the vehicle control module is configured to, in response to receiving the input from the driver, autonomously drive the vehicle based on the input.

4. The automated driving system of claim 1, wherein:
   the intervention module is configured to display a default option as one of the available options;
   the vehicle control module is configured to, when the input from the driver is not received via the interface within a set period of time from when the assistance was requested, autonomously drive the vehicle based on the default option; and
   the default option is a most conservative option of the available options.

5. An automated driving system comprising:
   at least one processor;
   a perception module implemented by the at least one processor and configured to detect an upcoming situation to be experienced by a vehicle;
   an intervention module implemented by the at least one processor and configured to
      determine that a confidence level for a driving decision to be made for the upcoming situation is at a level to request driver assistance,
      enable intervention of an autonomous driving mode and indicate information pertaining to the upcoming situation to a driver of the vehicle via an interface,
      based on the upcoming situation, request assistance from the driver by at least one of (i) indicating available options for the situation via the interface, or (ii) requesting information from the driver to aid in making the driving decision, and
      determine whether an input has been received from the driver via the interface indicating at least one of (i) a selected one of the available options, or (ii) the requested information; and
   a vehicle control module implemented by the at least one processor and configured to make autonomous driving decisions to autonomously drive the vehicle based on at least one of i) the determination of whether the input has been received, and ii) the input received,
   wherein the intervention module is configured to restrict a role of the driver by providing at least one of the input and another driver input without permitting the driver to control an actuator of the vehicle.

6. The automated driving system of claim 1, wherein the selected one of the available options is the driving decision.

7. The automated driving system of claim 1, wherein the vehicle control module is configured to make the driving decision based on the input and autonomously drive the vehicle based on the driving decision.

8. The automated driving system of claim 1, wherein the intervention module is configured to permit direct intervention of the autonomous driving mode by the driver when a set of options are available for a particular scenario.

9. The automated driving system of claim 1, wherein the intervention module is configured to:
 determine that a confidence level for a perception result obtained by the perception module is at a level to request driver assistance;
 permit indirect intervention of the autonomous driving mode by the driver, to request information from the driver pertaining to the perception result; and
 modify the perception result based on the requested information as received from the driver.

10. The automated driving system of claim 1, wherein the intervention module is configured to solicit the input from the driver while indicating to the driver via the interface the situation.

11. The automated driving system of claim 1, wherein the vehicle control module is configured to, for a direct intervention, enforce a selected one of the available options selected by the driver.

12. The automated driving system of claim 1, wherein the vehicle control module is configured to, for an indirect intervention, modify a perception result based on the requested information received from the driver via the interface.

13. A method of operating an automated driving system, the method comprising:
 detecting an upcoming situation to be experienced by a vehicle;
 determining that a confidence level for a driving decision to be made for the upcoming situation is at a level to request driver assistance;
 based on determining the confidence level for the driving decision to be made for the upcoming situation is at the level to request driver assistance, enabling intervention of an autonomous driving mode and indicate information pertaining to the upcoming situation to a driver of the vehicle via an interface;
 based on the upcoming situation, requesting assistance from the driver by at least one of (i) indicating available options for the situation via the interface, or (ii) requesting information from the driver to aid in making the driving decision;
 determining whether an input has been received from the driver via the interface indicating at least one of (i) a selected one of the available options, or (ii) the requested information; and
 aiding and enhancing automated driving decisions and associated operations by autonomously driving the vehicle based on whether the determination of the input has been received.

14. The method of claim 13, further comprising, in response to receiving the input from the driver, autonomously drive the vehicle based on the input.

15. The method of claim 13, further comprising:
 displaying a default option as one of the available options; and
 when the input from the driver is not received via the interface within a set period of time from when the assistance was requested, autonomously driving the vehicle based on the default option,
 wherein the default option is a most conservative option of the available options.

16. The method of claim 13, further comprising restricting a role of the driver by providing at least one of the driver input and another driver input without permitting the driver to control an actuator of the vehicle.

17. The method of claim 13, further comprising:
 for a direct intervention, enforcing the selected one of the available options as the driving decision; and
 for an indirect intervention, making the driving decision based on the input and autonomously driving the vehicle based on the driving decision.

18. The method of claim 13, further comprising:
 permitting direct intervention of the autonomous driving mode by the driver when a set of options are available for a particular scenario;
 determining that a confidence level for a perception result obtained is at a level to request driver assistance;
 permitting indirect intervention of the autonomous driving mode by the driver, to request information from the driver pertaining to the perception result; and
 modifying the perception result based on the requested information as received from the driver.

19. The method of claim 13, further comprising soliciting the input from the driver while indicating to the driver via the interface the situation.

20. The method of claim 13, further comprising:
 for a direct intervention, enforce a selected one of the available options selected by the driver; and
 for an indirect intervention, modify a perception result based on the requested information received from the driver via the interface.

\* \* \* \* \*